United States Patent
Tammera

(10) Patent No.: US 9,636,652 B2
(45) Date of Patent: May 2, 2017

(54) REACTOR BED VESSEL AND SUPPORT ASSEMBLY

(71) Applicant: Robert Frank Tammera, Warrenton, VA (US)

(72) Inventor: Robert Frank Tammera, Warrenton, VA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 722 days.

(21) Appl. No.: 14/097,729

(22) Filed: Dec. 5, 2013

(65) Prior Publication Data

US 2015/0158000 A1   Jun. 11, 2015

(51) Int. Cl.
| | |
|---|---|
| *B01J 8/00* | (2006.01) |
| *B01J 8/24* | (2006.01) |
| *B01J 19/00* | (2006.01) |
| *B01J 19/24* | (2006.01) |
| *B01J 19/30* | (2006.01) |
| *B01J 19/32* | (2006.01) |

(52) U.S. Cl.
CPC .............. *B01J 8/24* (2013.01); *B01J 8/008* (2013.01); *B01J 19/305* (2013.01); *B01J 19/325* (2013.01); *B01J 2208/00796* (2013.01); *B01J 2208/00884* (2013.01)

(58) Field of Classification Search
CPC ....... B01J 8/00; B01J 8/008; B01J 8/24; B01J 19/00; B01J 19/24; B01J 19/30; B01J 19/305; B01J 19/32; B01J 19/325; B01J 2208/00796; B01J 2208/00884
See application file for complete search history.

(56) References Cited

U.S. PATENT DOCUMENTS

| | | | |
|---|---|---|---|
| 1,005,933 A | 10/1911 | Brown | |
| 1,416,849 A | 5/1922 | Loop | |
| 2,505,851 A | 5/1950 | Wobker et al. | |
| 2,669,946 A | 2/1954 | Peyton | |
| 2,955,987 A * | 10/1960 | MacKay | B01J 8/008 196/46 |
| 3,099,538 A | 7/1963 | Kronig et al. | |

(Continued)

FOREIGN PATENT DOCUMENTS

| | | |
|---|---|---|
| FR | 2450626 A1 | 10/1980 |
| WO | 2014081545 A1 | 5/2014 |

OTHER PUBLICATIONS

PCT Application No. PCT/US2014/061308, Communication from International Searching Authority, PCT Form PCT/ISA/210, dated Feb. 24, 2015, 12 pages.

(Continued)

*Primary Examiner* — Natasha Young
(74) *Attorney, Agent, or Firm* — Glenn T. Barrett

(57) ABSTRACT

Vessel and support beam assembly includes a vessel having a cylindrical wall defining an interior chamber having a generally circular shape of diameter D in plan view, and a support assembly disposed within the interior chamber. The support assembly includes an inner hub defining an open central region, and a plurality of spokes extending radially from the inner hub. Each spoke is aligned radially with the cylindrical wall of the vessel and joined thereto. At least one open outer region is defined between circumferentially adjacent spokes.

19 Claims, 7 Drawing Sheets

(56) References Cited

U.S. PATENT DOCUMENTS

| | | |
|---|---|---|
| 3,169,835 A | 2/1965 | Huntley et al. |
| 3,425,810 A | 2/1969 | Scott, Jr. |
| 4,115,929 A | 9/1978 | Staub et al. |
| 4,220,416 A | 9/1980 | Brauner |
| 4,667,815 A | 5/1987 | Halene |
| 4,797,250 A | 1/1989 | Moreau |
| 4,932,546 A | 6/1990 | Stannard |
| 5,263,604 A | 11/1993 | Metz |
| 5,510,061 A | 4/1996 | Moore |
| 5,651,474 A | 7/1997 | Callaghan |
| 5,756,048 A * | 5/1998 | Zardi ............ B01J 8/008 422/311 |
| 5,916,529 A * | 6/1999 | Scheuerman ...... B01J 8/003 208/148 |
| 5,941,637 A | 8/1999 | Maurer |
| 6,167,608 B1 | 1/2001 | Burwell |
| 6,579,041 B2 | 6/2003 | Hobbs |
| 6,595,679 B2 | 7/2003 | Schuchardt |
| 6,659,303 B2 | 12/2003 | Garceau |
| 6,881,387 B1 | 4/2005 | Jacobs et al. |
| 7,077,997 B1 | 7/2006 | Sandacz |
| 8,061,890 B2 | 11/2011 | Suhner |
| 8,349,170 B2 | 1/2013 | Tammera et al. |
| 8,387,334 B2 | 3/2013 | Gulati |
| 2006/0261073 A1 | 11/2006 | Kanno |
| 2009/0092527 A1 | 4/2009 | Klinger et al. |
| 2011/0240526 A1 | 10/2011 | Tammera et al. |
| 2011/0315603 A1 | 12/2011 | Skoulidas et al. |
| 2013/0172172 A1 | 7/2013 | Gamas-Castellanos et al. |

OTHER PUBLICATIONS

PCT Application PCT/US2014/061307, Communication from the International Searching Authority received in co-pending, co-owned related patent application (Applicant's Reference No.) (U.S. Appl. No. 14/097,827, Form PCT/ISA/220, dated Feb. 24, 2015, 13 pages.

* cited by examiner

REACTOR BED VESSEL AND SUPPORT ASSEMBLY

BACKGROUND

Field of the Disclosed Subject Matter

The present disclosed subject matter relates to a reactor vessel having an internal support assembly, and particularly to an assembly and method to support pressure vessel internal hardware within a multi-phase reaction bed vessel.

Description of Related Art

Fluid catalytic cracking (FCC) processes are used for petroleum and petrochemical conversion processes. These processes can provide efficient and selective catalytic cracking of hydrocarbon-containing feedstock. For example, small catalyst particles can be fluidized and mixed with a feedstock by intimate contact under thermally active conditions to generally produce lower molecular weight "cracked" products. FCC processes are beneficial due at least in part to the ability to continuously recycle and regenerate the spent catalysts and to process large volumes of hydrocarbon-containing feedstock.

In FCC processes, higher molecular weight feeds contact fluidized catalyst particles, most advantageously in the riser reactor of the fluidized catalytic cracking unit. Contact between feed and catalyst can be controlled according to the type of product desired. In catalytic cracking of the feed, reactor conditions, including temperature and catalyst circulation rate, can be adjusted to increase formation of the desired products and reduce the formation of less desirable products, such as light gases and coke.

Various fluidized catalytic cracking reactor riser and reactor vessel designs can be utilized. For example, certain fluidized catalytic cracking reactors utilize a short contact-time cracking configuration. With this configuration, the catalyst contacts the fluidized catalytic cracker feedstream for a limited time in order to reduce excessive cracking, which can result in the increased production of less valued products such as light hydrocarbon gases, as well as increased coking deposition on the cracking catalysts.

Certain fluidized catalytic cracking configurations utilize a reactor riser cracking configuration wherein the catalyst can contact the fluidized catalytic cracker feedstock in a reactor riser, and the catalyst and the hydrocarbon reaction products can be separated shortly after the catalyst and hydrocarbon mixture flows from the reactor riser into the fluidized catalytic cracking reactor. Many different fluidized catalytic cracking reactor designs are known. For example, certain designs utilize mechanical cyclones internal to the reactor to separate the catalyst from the hydrocarbon reactor products. This separation process can reduce post-riser reactions between the catalyst and the hydrocarbons as well as separate the cracked hydrocarbon products for further processing from the spent catalyst, which can be regenerated and reintroduced into the reaction process.

Catalyst separated from the cracked hydrocarbon products in the FCC reactor can be considered as "spent catalyst" until such time as the catalyst can typically be sent to an FCC regenerator vessel and regenerated into a "regenerated catalyst." In such a process, the spent catalyst can flow through a gaseous stream stripping section to remove most or all of the hydrocarbon layer remaining on the catalyst after separation from the bulk of the FCC products. This "stripped" catalyst can then be sent via a spent catalyst riser to an FCC regenerator to oxidize the spent catalyst and burn away the remaining hydrocarbons and coke to convert the spent catalyst to regenerated catalyst.

The stripping section can include various vessel hardware supported and/or suspended within the reactor bed vessel. The vessel hardware can include multiple objects having dissimilar or irregular shapes. Certain support structures for vessel hardware typically include parallel chord members secured to the cylindrical vessel wall. Such chord members are secured to the cylindrical vessel wall in alignments other than radial, which can introduce unsuitable material stress concentration levels and undesirable refractory junctions at the connection point with the vessel wall. Furthermore, the non-radial connection formed at a bi-material junction of steel with a gunned refractory system can introduce irregular fractures through the lining, which can affect gas flow paths and lead to non-uniform elevated shell temperatures or "hot spots" that can affect performance of the vessel and lead to costly repairs. Additionally, the non-radial chord members can introduce space limitations within the vessel wall that can hinder or prevent workman access for inspection and repair, and require specialized rigging equipment to install.

As such, there remains a need for assemblies and methods to support vessel hardware in a reaction bed vessel, as well as provide improved connections to the reaction bed vessel.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a vessel and support beam assembly. The assembly includes a vessel having a cylindrical wall defining an interior chamber with a generally circular shape of diameter D in plan view, and a support assembly disposed within the interior chamber. The support assembly includes an inner hub defining an open central region and a plurality of spokes extending radially from the inner hub. Each spoke is aligned radially with the cylindrical wall of the vessel and joined thereto. An open outer region is defined between circumferentially adjacent spokes.

For example and as embodied here, the inner hub can have a polygonal shape in plan view, and in some embodiments, the polygonal shape can be a symmetrical, hexagonal shape. One or more spokes can extend across the diameter D of the interior chamber to divide the open central region into central region portions. The central region portions can have a substantially uniform size and shape. Additionally or alternatively, the one or more open outer regions can have a substantially uniform size and shape.

In some embodiments, each spoke can be joined to the cylindrical wall by a threaded fastener. As embodied herein, the assembly can include six spokes as the plurality of spokes. Additionally or alternatively, two spokes can be formed by a single member. Each spoke can extend from a corner of the inner hub toward the cylindrical wall. The spokes can be spaced equally about a central axis of the cylindrical wall.

Additionally and as embodied here, the support assembly can define an upper support plane to support an upper load thereon. The support assembly can be sized to support one or more lower loads secured thereto. Each side of the inner hub can be formed of a beam having a height, a width, a first end and a second end. In some embodiments, the height of at least one beam can taper from a first height at the first end toward a second height at the second end, and furthermore the first end with the greater height can be joined to a spoke extending across the diameter of the inner chamber. Additionally or alternatively, the first end can be joined to a spoke having a substantially similar height as the first end, and the second end can be joined to a spoke having a substantially similar height as the second end.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

DETAILED DESCRIPTION OF THE PREFERRED EMBODIMENT

Reference will now be made in detail to the various exemplary embodiments of the disclosed subject matter, exemplary embodiments of which are illustrated in the accompanying drawings. The structure and corresponding method of operation of the disclosed subject matter will be described in conjunction with the detailed description of the system.

The apparatus and methods presented herein can be used for supporting any of a variety of suitable vessel hardware, such as structured packing or stripping sheds, for example in a reactor bed vessel. In one embodiment, the reactor bed vessel can be a fluidized bed reactor or a packed bed reactor having one or more ridged assemblies for use in separating hydrocarbons from a catalyst. Additional details regarding fluidized bed reactors and other aspects of fluidized catalytic cracking (FCC) processes are provided in U.S. Pat. No. 8,349,170 and U.S. Patent Application Publication Nos. 2011/0240526 and 2011/0315603, each of which are incorporated by reference herein in its entirety.

In accordance with the disclosed subject matter herein, the reactor bed vessel and support assembly generally includes a vessel having a cylindrical wall defining an interior chamber with a generally circular shape of diameter D in plan view, and a support assembly disposed within the interior chamber. The support assembly includes an inner hub defining an open central region and a plurality of spokes extending radially from the inner hub. Each spoke is aligned radially with the cylindrical wall of the vessel and joined thereto. An open outer region is defined between circumferentially adjacent spokes.

Figure 1:
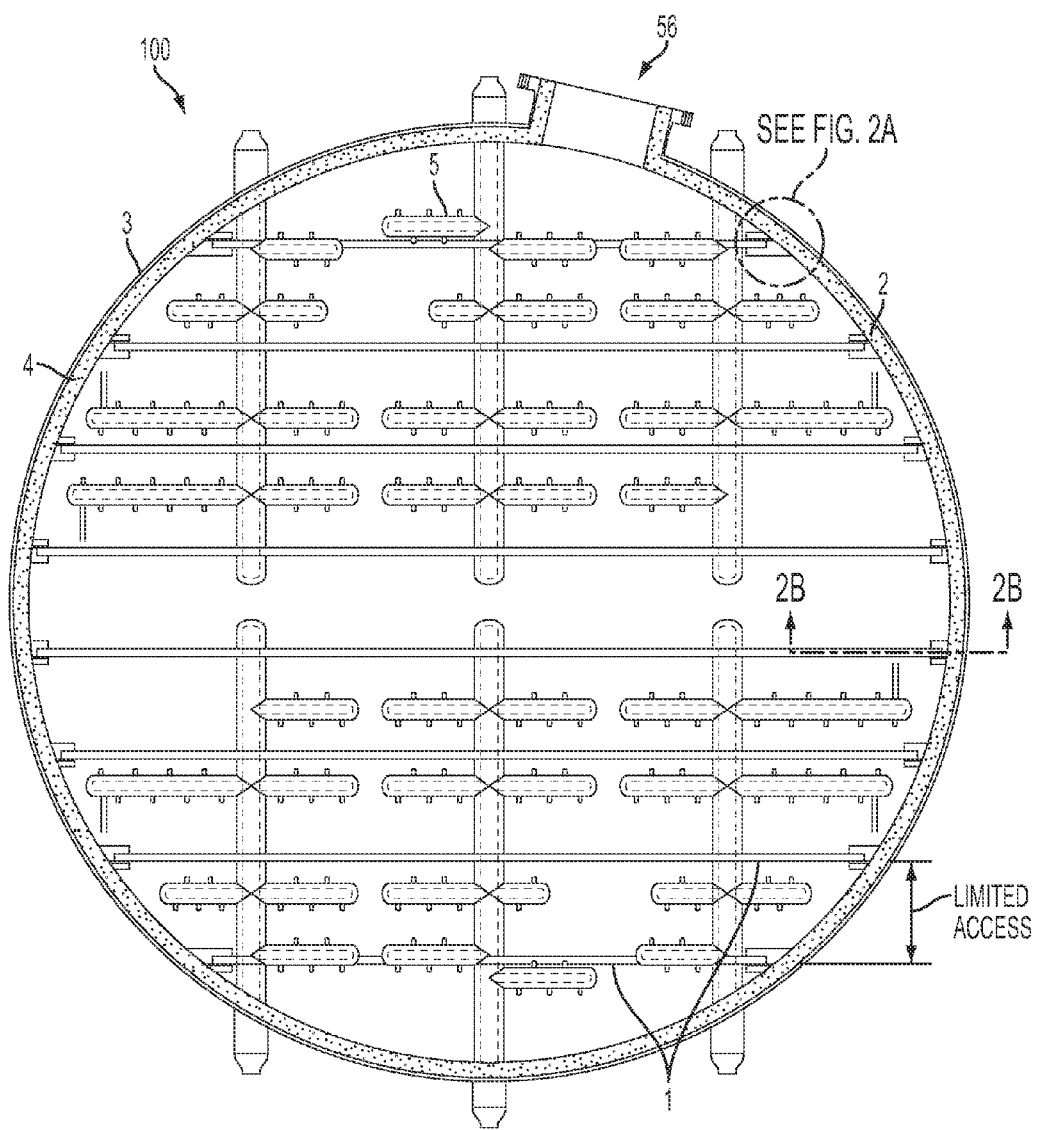
FIG. 1 is a plan view illustrating a conventional reactor bed vessel and support assembly for purpose of illustration and comparison to the disclosed subject matter.

The accompanying figures, where like reference numerals refer to identical or functionally similar elements throughout the separate views, serve to further illustrate various embodiments and to explain various principles and advantages all in accordance with the disclosed subject matter. For purpose of comparison, an exemplary embodiment of a conventional support assembly is depicted in FIGS. 1-3, whereas for purpose of explanation and illustration, and not limitation, exemplary embodiments of the reactor bed vessel and support assembly in accordance with the disclosed subject matter are shown in FIGS. 4A-7. While the present disclosed subject matter is described with respect to a rector bed vessel for a bed reactor in a fluid catalytic cracking process, one skilled in the art will recognize that the disclosed subject matter is not limited to the illustrative embodiment, and that the component can be used to support any suitable structure in any suitable chamber.

For purpose of comparison to and illustration of the disclosed subject matter, referring to a conventional reactor bed vessel support and assembly illustrated in FIGS. 1-3, a reactor bed vessel and support assembly 100 includes a series of parallel beams 1 disposed across a pressure vessel 3. As shown in FIG. 1, the chord length of each beam 1 can vary across the diameter of the pressure vessel 3, and the relatively narrow distance required between adjacent beams 1 in such embodiments can inhibit or prevent access for inspection and/or repair inside the pressure vessel 3.

Figure 2A:
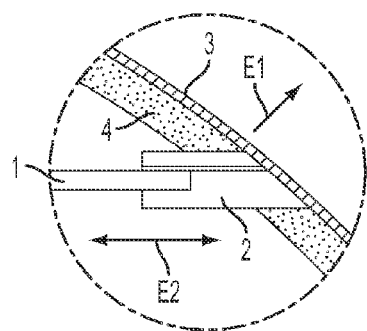
FIG. 2A is a detail view of region 2A in FIG. 1.
Figure 3:
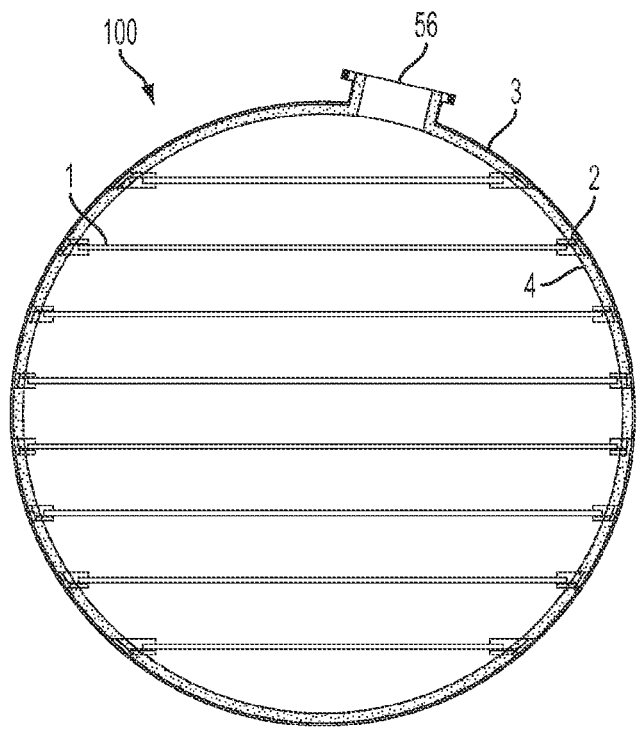
FIG. 3 is a plan view illustrating the conventional reactor bed vessel and support assembly of FIG. 1, with portions removed for purpose of illustration and comparison.

As shown for example in FIGS. 1 and 2A, each beam 1 is joined at each end by an anchor 2 to the pressure vessel 3 proximate the refractory lining 4. The configuration of the beams 1 can allow for thermal movement, but also results in non-radial junctions. As such, the pressure from the beams can fracture the refractory lining 4 of the pressure vessel 3, which can alter gas flow within the pressure vessel 3 and result in non-uniform elevated temperature increases or "hot spots" to form in the pressure vessel 3.

FIG. 2A illustrates movement due to thermal expansion of chord beam 1 in non-radial alignment with pressure vessel 3. As shown in FIG. 2A, during operation of the assembly 100, pressure vessel 3 can expand radially in direction E1 due at least in part to thermal expansion from heating of the pressure vessel 3. By contrast, chord beam 1 moves in direction E2 due at least in part to thermal expansion from heating of the chord beam 1. The oblique angle formed between E1 and E2 can create unwanted pressure on the pressure vessel 3 and can cause fractures in the refractory lining 4 thereof.

Figure 2B:
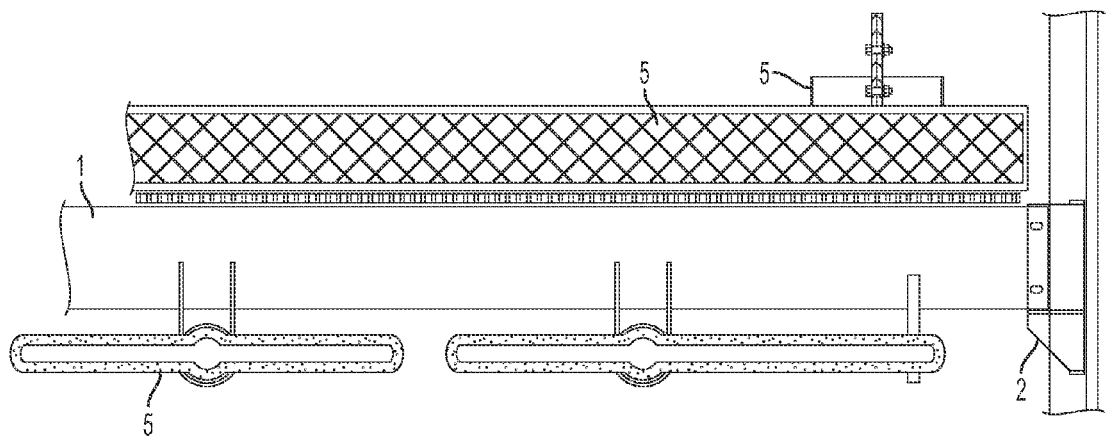
FIG. 2B is a cross-sectional side view taken along line 2B-2B in FIG. 1.

As shown for example in FIG. 2B, loads 5, such as vessel hardware, can be supported on and/or suspended from the beams 1. The construction and number of beams 1 required will be determined at least in part by the size and weight of the loads to be supported. For example, the cross-sectional dimensions of each beam 1 may be limited or restricted. As such, increased size and/or weight of the loads can increase the number of beams 1 to be utilized, which can increase the number of non-radial junctions and thus increase the risk of fractures in the refractory lining 4.

Referring now to an illustrative embodiment of FIGS. 4A-6B, a reactor bed vessel and support assembly 1000 includes a support structure 6 including an inner hub 60 defining an open central region 62. The inner hub 60 and thus the open central region 62 can have a polygonal shape, and particularly a symmetric polygonal shape in certain embodiments. For example and as embodied herein a symmetric, hexagonal shape is provided. Alternatively, the inner hub 60 and open central region 62 can have a circular, triangular, rectangular, octagonal or any other suitable shape. As a further alternative, the inner hub 60 can have an asymmetric shape.

The inner hub 60 can be formed, for example and as embodied herein, by welding or otherwise securing flat plate metallic members at a number of junctions corresponding to the desired polygonal shape of the inner hub 60. The junctions of the inner hub 60 can be aligned to define a reference plane generally perpendicular to a central axis of the pressure vessel 3. Furthermore, and as embodied herein, the center of the inner hub 60 can be substantially aligned with the central axis of the pressure vessel 3. The assembly 1000 embodied herein is configured with a single inner hub 60. However, in alternative embodiments, additional hubs can be formed concentrically surrounding the inner hub 60 and joined to the inner hub 60. Alternatively, each hub can be free of junctions, for example where each hub is configured as a circular member.

Figure 4A:
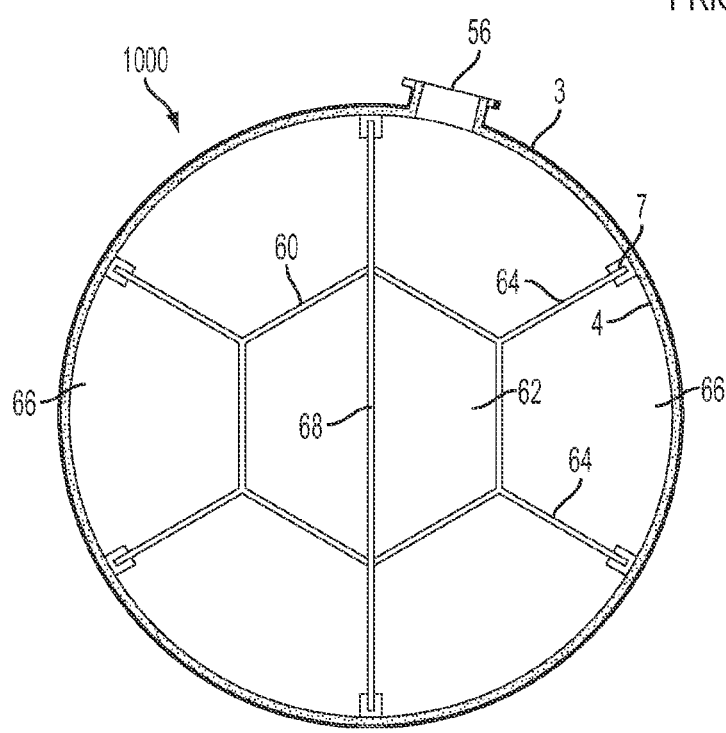
FIG. 4A is a plan view of an exemplary embodiment of a reactor bed vessel and support assembly according to the disclosed subject matter, with portions removed for purpose of illustration.
Figure 4B:
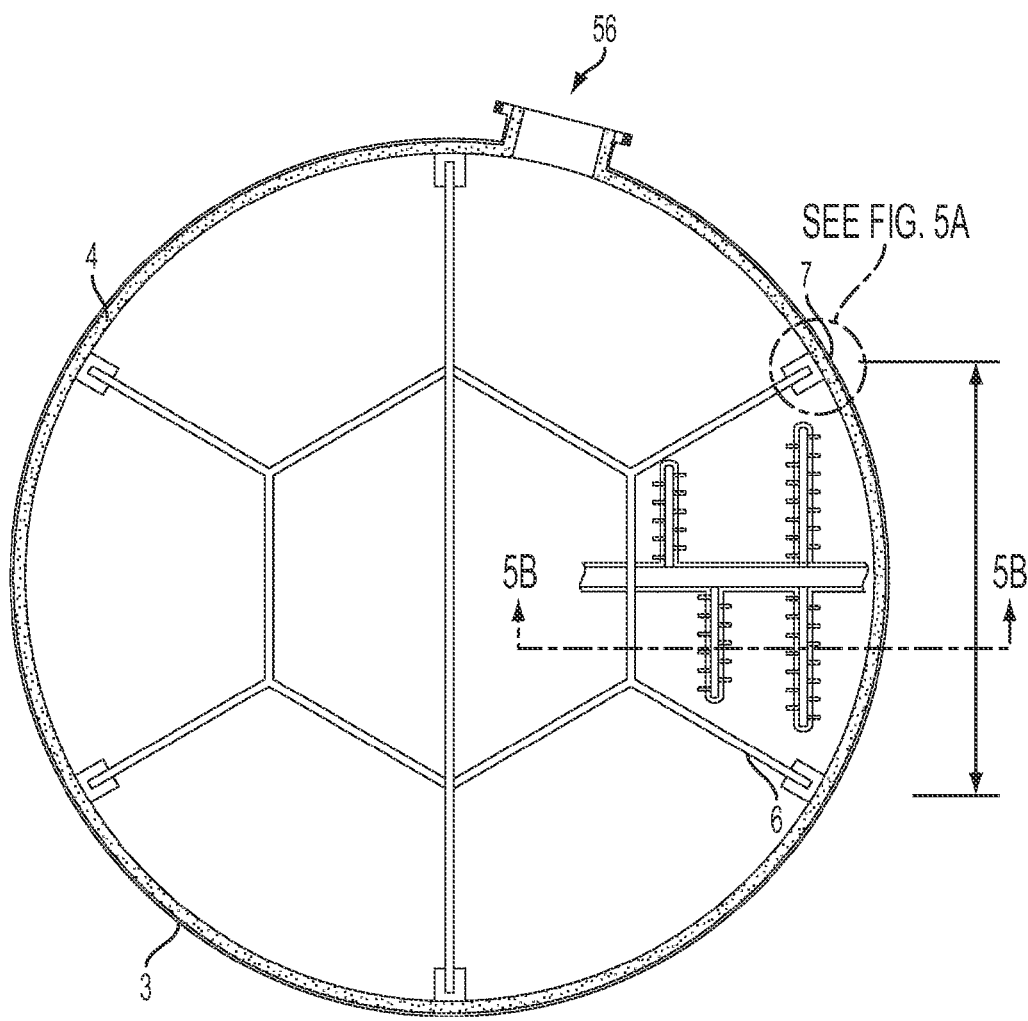
FIG. 4B is a plan view illustrating an exemplary embodiment of a reactor bed vessel and support assembly according to the disclosed subject matter.

With reference to FIGS. 4A-4B, a number of spokes 64 extend radially from the inner hub 60, and are aligned radially with and joined directly or indirectly to the pressure vessel 3 proximate the refractory lining 4. Any suitable joint configuration can be employed, preferably to accommodate thermal expansion of the support structure relative to the pressure vessel 3. Each of the spokes 64 thus can be similar in length between the inner hub 60 and the pressure vessel wall 3. Furthermore, the plurality of spokes can be spaced evenly circumferentially about the inner hub 60. In this manner, forces acting on the support assembly 6 can be distributed evenly to the pressure vessel wall 3. Additionally, circumferentially adjacent spokes can define a number of open outer regions 66 between the inner hub 60 and the refractory lining of the pressure vessel 3. The open outer regions can be uniform in size and shape, and can be sized to allow access for a worker to inspect and/or perform repairs to the pressure vessel or hardware therein. Each spoke 64 can extend from a junction or corner formed in the inner hub 60.

In accordance with another aspect and as depicted in FIG. 4, two spokes 64 can be formed from a single extended spoke member 68, which can extend across the diameter D of the pressure vessel 3. In this manner, the extended spoke 68 can pass through the inner hub 60, and thus can divide the open central region 62 into two or more central region portions. As such, and as embodied herein, the central region portions can have a substantially similar size and shape. Alternatively, the spokes 64 can all be disposed radially outward from the inner hub 60, and thus the open central region 62 can be free of spokes 64 therein.

Similar to the inner hub 60, the spokes 64 and/or the extended spoke 68 can be formed from flat plate metal. Furthermore, some or all of the inner hub 60, spokes 64 and/or the extended spoke 68 can form an upper support surface having a generally even, horizontal profile or reference plane. As such, top surface of the inner hub 60, spokes 64 and/or the extended spoke 68 can provide support for vessel hardware placed or secured thereupon. As a further feature, each beam forming the inner hub 60 and the spokes 64 can have similar dimensions and shape, which can minimize the cost of fabrication compared to conventional assemblies having varying chord beam lengths along the diameter of the pressure vessel 3, as described above.

Additionally or alternatively, some or all of the inner hub 60, spokes 64 and/or the extended spoke 68 can have a tapered lower beam surface that can be tapered from a first end having a first height to a second end having a second height. In this manner, the profile of the inner hub 60, spokes 64 and extended spoke can be configured to provide a desired beam depth, which can be chosen for example to meet size constraints within the pressure vessel 3 and to provide adequate strength to support vessel hardware placed or secured thereon and/or suspended therefrom. For example, as shown in FIG. 5B, each spoke 64 can have a first end 63 joined to the pressure vessel 3 or another spoke 64 and can taper to an increased height toward a second end 65 of the spoke 64. The second end 65 of the spoke 64 can be joined to one or more beams having substantially the same height as the second end.

Figure 5A:
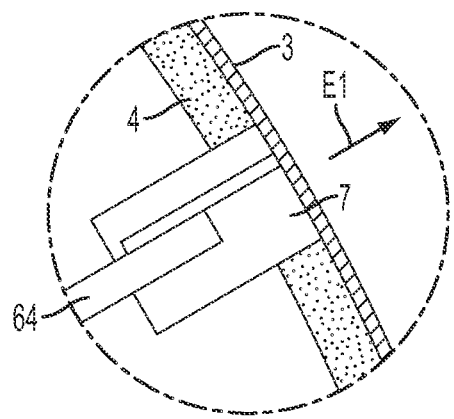
FIG. 5A is a detail view of region 5A in FIG. 4B.
Figure 5B:
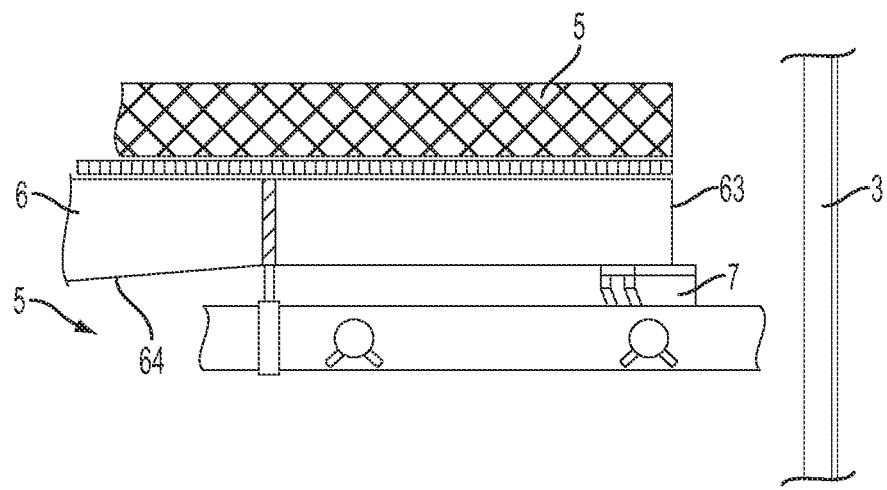
FIG. 5B is a cross-sectional side view taken along line 5B-5B in FIG. 4B.
Figure 6A:
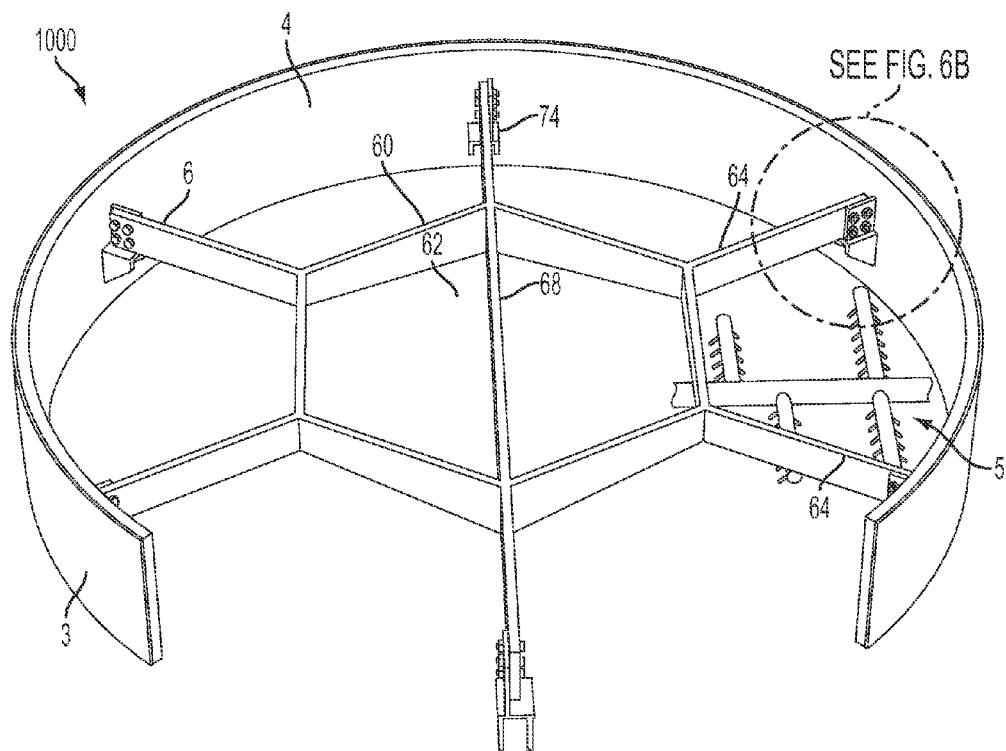
FIG. 6A is an elevated perspective view of the exemplary vessel and support assembly of FIG. 4B, with portions removed for purpose of illustration.
Figure 6B:
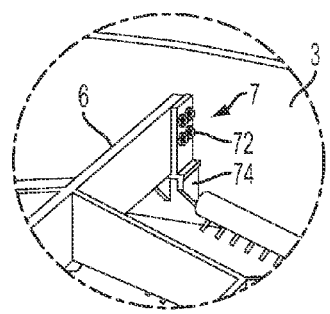
FIG. 6B is a detail view of region 6B in FIG. 6A.

FIG. 5A schematically illustrates movement due to thermal expansion of support structure 6 in radial alignment with pressure vessel 3. As shown in FIG. 5A, during operation of the assembly 1000, pressure vessel 3 can expand radially in direction E1 due at least in part to thermal expansion from heating of the pressure vessel 3. Likewise, support structure 6 moves in direction E1 due at least in part to thermal expansion from heating of the support structure. The tandem movement of pressure vessel 3 and support structure 6 in direction E1 can reduce pressure on the pressure vessel 3 compared to the oblique-angled thermal movement of the conventional assembly 100 illustrated in FIG. 2A, and thus the occurrence of fractures in the refractory lining 4 of the pressure vessel can be reduced.

Referring now to FIGS. 5B-6B, multiple hardware objects 5 can be supported on and/or suspended from support structure 6. For example and without limitation, hardware objects 5 can include one or more stripping sheds or structured packing placed on an upper surface of the support structure 6 and secured thereto with a fastener. Additionally or alternatively, hardware objects 5 can include one or more pieces of vessel hardware suspended from support structure 6. The hardware objects 5 can be suspended, for example and without limitation, by support straps 52 tied and/or welded to the support structure 6 and the hardware objects 5 suspended therefrom. For example and without limitation, hardware objects 5 suspended from the support structure 6 or a ring pipe can be added.

As further illustrated in FIGS. 5B-6C, the support structure 6 can be anchored to the pressure vessel 3 using suitable anchors 7 attached between the spokes 64 and the refractory lining 4 of the pressure vessel 3. For example, anchors 7 can include one or more threaded fasteners 72 fastened to an anchor mount 74, which can be welded or formed integrally with the pressure vessel 3. Such an anchor mount 74 is preferably configured to allow expansion and contraction due to thermal loads.

Referring now to FIGS. 3 and 4A, for purpose of comparison to and illustration of the disclosed subject matter, the conventional reactor bed vessel and support assembly 100 is shown along side the exemplary reactor bed vessel and support assembly 1000 according to the disclosed subject matter. Each of conventional assembly 100 and exemplary assembly 1000 are shown with a similar vessel 3 diameter. Under similar loading conditions, the conventional assembly 100, as shown in FIG. 3, requires 16 junctions formed through the refractory lining 4 of the pressure vessel 3. By comparison, as shown in FIG. 4A, the exemplary assembly 1000 utilizes 6 junctions formed through the refractory lining 4 of the pressure vessel, and as such, under similar loading conditions, 62.5% fewer junctions can be utilized. In this manner, the installation and materials cost can be reduced, along with the risk of forming a fracture in the refractory lining 4.

As further illustrated in FIG. 3, in the conventional assembly 100, the total surface area of the chord beams 1 occupies about 30 square feet of the surface area of the pressure vessel 3 in plan view. By comparison, with reference to FIG. 4A, in the exemplary assembly 1000 of the disclosed subject matter, the support structure 6 utilizes about 19.8 square feet of the surface area of the pressure vessel 3 in plan view. As such, the support structure 6 of the disclosed subject matter utilizes 34% less surface area of the pressure vessel 3. The reduced surface area of the assembly 1000 disposed across the pressure vessel 3 diameter can reduce pressure drops within the pressure vessel 3 and improve catalyst throughput therein.

Figure 7:
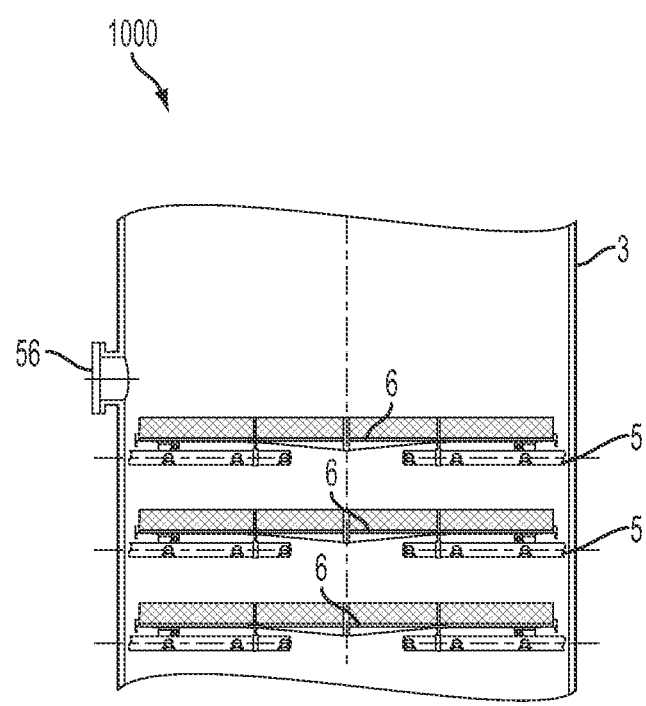
FIG. 7 is a cross-sectional elevation view of the reactor bed vessel and support assembly of FIG. 4B.

For purpose of illustration and not limitation, reference is now made to FIG. 7, which is an elevation view illustrating the reactor bed vessel and support assembly 1000 according to the disclosed subject matter. As shown in FIG. 7, the assembly 1000 can include multiple support structures 6 aligned in a stacked configuration long the length of the pressure vessel 3 and secured thereto. Each support structure 6 can include multiple hardware objects 5 secured thereon and/or suspended therefrom, as described herein. The pressure vessel 3 can include additional hardware therein, such as one or more cyclone assemblies 54 secured thereto. Pressure vessel can further include one or more access nozzles formed therein 56.

For example and without limitation, and as embodied herein, the reactor bed vessel and support assembly 1000 can be utilized as part of a fluid catalytic cracking (FCC) process reactor, such as a methanol to gas reactor system. However, the assembly 1000 described herein can be utilized in any reactor system or process for petrochemical refinement, including but not limited to cyclone systems or any other suitable reactor system. It is contemplated that the presently disclosed subject matter may be used in connection with various fluid bed technologies including but not limited to (i) the preparation of at least one of phthalic anhydride, vinyl acetate, acrylonitrile, ethylene dichloride, chloromethane, maleic anhydride, polyethylene, polypropylene and o-cresol; (ii) Fischer-Tropsch synthesis; (iii) resid cat cracking; (iv) the conversion of at least one methanol to olefins (MTO), methanol to aromatics (MTA), methanol to paraxylene (MTP), methanol to gasoline (MTG), Methanol to diesel (MTD), syngas to olefins, syngas to aromatics, syngas to paraxylene, coal to olefins. coal to aromatics, Benzene and/or Toluene Methylation with Methanol or DME to Aromatics, Benzene and/or Toluene Methylation with Methanol or DME to Paraxylene, Toluene Ethylation to MEB (methylethylbenzene), Benzene Ethylation to DEB (Diethylbenzene), Biomass to Olefins, Biomass to Aromatics, and Biomass to Gasoline.

While the disclosed subject matter is described herein in terms of certain preferred embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

ADDITIONAL EMBODIMENTS

Embodiment 1

A vessel and support beam assembly, comprising: a vessel having a cylindrical wall defining an interior chamber having a generally circular shape of diameter D in plan view; and a support assembly disposed within the interior chamber, the support assembly comprising an inner hub defining an open central region, the support assembly further comprising a plurality of spokes extending radially from the inner hub, each spoke aligned radially with the cylindrical wall of the vessel and joined thereto, wherein at least one open outer region is defined between circumferentially adjacent spokes.

Embodiment 2

The assembly of Embodiment 1, wherein the inner hub has a polygonal shape in plan view.

Embodiment 3

The assembly of Embodiment 2, wherein the polygonal shape of the inner hub is a symmetrical, hexagonal shape.

Embodiment 4

The assembly of anyone of Embodiments 1-3, wherein at least one of the plurality of spokes extends across the diameter D of the interior chamber to divide the open central region into a plurality of central region portions.

Embodiment 5

The assembly of Embodiment 4, wherein the plurality of central region portions have a substantially uniform size and shape.

Embodiment 6

The assembly of anyone of Embodiments 1-5, wherein the one or more open outer regions have a substantially uniform size and shape.

Embodiment 7

The assembly of anyone of Embodiments 1-6, wherein each spoke is joined to the cylindrical wall by a threaded fastener.

Embodiment 8

The assembly of anyone of Embodiments 1-7, comprising six spokes as the plurality of spokes.

Embodiment 9

The assembly of Embodiment 8, wherein two spokes are formed by a single member.

Embodiment 10

The assembly of anyone of Embodiments 1-9, wherein each spoke extends from a corner of the inner hub toward the cylindrical wall.

Embodiment 11

The assembly of anyone of Embodiments 1-10, wherein the plurality of spokes are spaced equally about a central axis of the cylindrical wall.

Embodiment 12

The assembly of anyone of Embodiments 1-11, wherein the support assembly defines an upper support plane to support an upper load thereon.

Embodiment 13

The assembly of anyone of Embodiments 1-12, wherein the support assembly is sized to support one or more lower loads secured thereto.

Embodiment 14

The assembly of anyone of Embodiments 1-13, wherein each side of the inner hub is formed of a beam having a height, a width, a first end and a second end.

Embodiment 15

The assembly of Embodiment 14, wherein the height of at least one beam tapers from a first height at the first end toward a second height at the second end.

Embodiment 16

The assembly of Embodiment 14, wherein the first end is joined to a spoke extending across the diameter of the inner chamber.

Embodiment 17

The assembly of Embodiment 14, wherein the first end is joined to a spoke having a substantially similar height as the first end, and the second end is joined to a spoke having a substantially similar height as the second end.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A vessel and support beam assembly, comprising:
 a vessel having a cylindrical wall defining an interior chamber having a generally circular shape of diameter D in plan view; and
 a support assembly disposed within the interior chamber, the support assembly comprising an inner hub defining an open central region, the support assembly further comprising a plurality of spokes extending radially from the inner hub, each spoke aligned radially with the cylindrical wall of the vessel and joined thereto, wherein at least one open outer region is defined between circumferentially adjacent spokes, wherein at least one of the plurality of spokes extends across the diameter D of the interior chamber to divide the open central region into a plurality of central region portions, whereby a portion of the open region is located on one side of the one spoke and another portion of the open region is located on an opposing side of the one spoke.

2. The assembly of claim 1, wherein the inner hub has a polygonal shape in plan view.

3. The assembly of claim 2, wherein the polygonal shape of the inner hub is a symmetrical, hexagonal shape.

4. The assembly of claim 1, wherein the one or more open outer regions have a substantially uniform size and shape.

5. The assembly of claim 1, wherein each spoke is joined to the cylindrical wall by a threaded fastener.

6. The assembly of claim 1, wherein each spoke extends from a corner of the inner hub toward the cylindrical wall.

7. The assembly of claim 1, wherein the plurality of spokes are spaced equally about a central axis of the cylindrical wall.

8. The assembly of claim 1, wherein the support assembly defines an upper support plane to support an upper load thereon.

9. The assembly of claim 1, wherein the support assembly is sized to support one or more lower loads secured thereto.

10. A vessel and support beam assembly, comprising:
 a vessel having a cylindrical wall defining an interior chamber having a generally circular shape of diameter D in plan view; and
 a support assembly disposed within the interior chamber, the support assembly comprising an inner hub defining an open central region, the support assembly further comprising a plurality of spokes extending radially from the inner hub each spoke aligned radially with the cylindrical wall of the vessel and joined thereto, wherein at least one open outer region is defined between circumferentially adjacent spokes,
 wherein each side of the inner hub is formed of a beam having a height, a width, a first end and a second end.

11. The assembly of claim 10, wherein the height of at least one beam tapers from a first height at the first end toward a second height at the second end.

12. The assembly of claim 10, wherein the first end is joined to a spoke extending across the diameter of the inner chamber.

13. The assembly of claim 10, wherein the first end is joined to a spoke having a substantially similar height as the first end, and the second end is joined to a spoke having a substantially similar height as the second end.

14. The assembly of claim 10, wherein the inner hub has a polygonal shape in plan view.

15. The assembly of claim 14, wherein the polygonal shape of the inner hub is a symmetrical, hexagonal shape.

16. The assembly of claim 10, wherein each spoke is joined to the cylindrical wall by a threaded fastener.

17. The assembly of claim 10, wherein each spoke extends from a corner of the inner hub toward the cylindrical wall.

18. The assembly of claim 10, wherein the support assembly defines an upper support plane to support an upper load thereon.

19. The assembly of claim 10, wherein the support assembly is sized to support one or more lower loads secured thereto.

\* \* \* \* \*